UNITED STATES PATENT OFFICE 2,653,926

METALLIFEROUS MONOAZO DYESTUFFS

Christian Zickendraht, Binningen, and Robert Wittwer, Basel, Switzerland, assignors to Ciba Limited, Basel, Switzerland, a Swiss firm No Drawing. Application October 15, 1951, Serial No. 251,456. In Switzerland November 1, 1950

7 Claims. (Cl. 260—147)

This application is a continuation-in-part of our copending application Serial No. 199,346, filed December 5, 1950, now abandoned.

This invention relates to cobalt and copper compounds of ortho-hydroxyazo dyestuffs which contain two sulfonic acid groups and correspond to the formula (1)
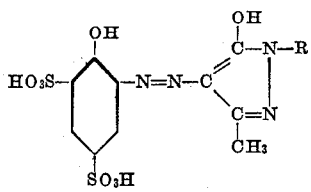

wherein R represents a substituted or unsubstituted benzene radical.

The new metal compounds can be obtained by treating monoazo dyestuffs containing two sulfonic acid groups and corresponding to the general formula (1) with an agent providing one of the metals numbered 27 and 29 in the periodic system.

The metal-free monoazo dyestuffs of the general formula (1) are known. The process of their manufacture from diazotized 2-amino-1-hydroxybenzene - 4,6 - disulfonic acid and 1-phenyl-3-methyl-5-pyrazolones is likewise known.

As 1 - phenyl - 3 - methyl - 5 - pyrazolones there can be used such compounds as 1-(4'-methylphenyl) - 3 - methyl - 5 - pyrazolone, preferably 1 - (2',5' - dichlorophenyl) - 3 - methyl - 5 - pyrazolone, 1 - (3'- or 4' - chlorophenyl) - 3 - methyl - 5 - pyrazolone, 1 - (2'-chlorophenyl) - 3 - methyl - 5 - pyrazolone, and 1 - phenyl - 3 - methyl - 5 - pyrazolone.

The conversion of the dyestuffs into their copper and cobalt compounds can be brought about with the crude products, i e. in the form in which they are present in the coupling mixture. Alternatively, the dyestuff may first be filtered or purified, for example by recrystallization or by dissolving it and precipitating it from its solution.

The agents providing metals of the atomic numbers 27 and 29, that is agents yielding cobalt or copper are preferably used in the form of salts which contain the metals named as cations, such for example as cobalt acetate, cobalt sulfate, copper sulfate, copper acetate. In many cases it is of advantage to use complex metal compounds, e. g. in the form of metal-amine complexes, such as copper tetramine sulfate from ammonia, pyridine, or monoethanolamine, or in the form of compounds which contain one of the said metals in complex union in the anion, e. g. complex cobalt or copper compounds of the alkali salts of aliphatic aminocarboxylic acids or of the alkali salts of aliphatic hydroxy carboxylic acids, such as of glycine, lactic acid, and principally tartaric acid, for example sodium copper tartrate.

The treatment with the agents providing metal can be conducted according to known methods, e. g. by heating to temperatures between 50 and 120° C. in an open vessel, e. g. with reflux cooling or, if desired, in a closed vessel under pressure, the pH being such as indicated by the nature of the metallizing process; for example, acid coppering with copper sulfate, and alkaline coppering with copper tetramine sulfate. If desired, other substances, as for example, alcohol may be added.

As regards the metallizing process, with the dyestuffs to be used here, a rather short treatment period at a temperature of 70 to 90° C. with salts such as acetates or sulfates may suffice.

The new metalliferous dyestuffs can be worked up in the usual manner.

The new dyestuffs obtained by the instant process are complex metal compounds containing one of the metals copper or cobalt in complex union with monoazo dyestuffs of the general formula

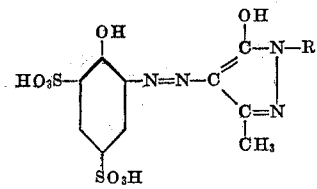

wherein R has the significance indicated in connection with Formula 1.

The new complex copper and cobalt compounds are suitable for dyeing materials of animal origin. However, they are primarily suitable for dyeing anodically oxidized aluminum on which they produce dyeings which are especially fast to light.

The following examples illustrate the invention, the parts and percentages being by weight.

Example 1

47.6 parts of the sodium salt of the dyestuff from diazotized 2-amino-1-hydroxybenzene-4,6-disulfonic acid and 1 - phenyl-3-methyl-5-pyrazoline, which dyestuff corresponds to the formula

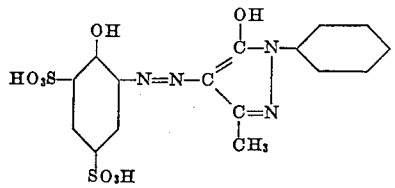

are dissolved at 70–75° C. in 150 parts of water and to the resultant solution there are added 120 parts of a copper sulfate solution containing 7.8 parts of copper. The whole is stirred at 70–75° C. for 30 minutes and the completely precipitated copper complex then separated by filtration. The cupriferous dyestuff so obtained is mixed with 40 parts of water and 30 parts of a 30% sodium hydroxide solution and the resultant paste dried under reduced pressure. The cupriferous dyestuff obtained in this manner is a yellow-brown powder which readily dissolves in water with a yellow-brown coloration and dyes anodized aluminum golden yellow shades of very good fastness to light.

For dyeing anodized aluminum the new dyestuffs can be used as explained below:

A piece of pure aluminum, anodically oxidized as usual in a sulfuric acid electrolyte with 1.5 amperes per square decimeter, is treated for half an hour at 65° C. in a dyebath containing 0.05 to 0.2 gram per liter of the dyestuff. A brilliant golden shade is obtained whose fastness to light after the usual sealing operation in boiling water is excellent.

The affinity of the dyestuff can be increased by an adjustment of the pH value of the dyebath to 5 through the addition of e. g. 10 grams per liter of crystallized sodium acetate and 1 cc. per liter of 40% acetic acid.

A similar copper compound is obtained by employing 1 - (4' - chloro) - phenyl - 3 - methyl-5-pyrazolone or 1 - (2',5' - dichloro) - phenyl - 3-methyl - 5 - pyrazolone instead of 1 - phenyl - 3-methyl-5-pyrazolone in the above example.

*Example 2*

51 parts of the sodium salt of the dyestuff from diazotized 2-amino-1-hydroxybenzene-4,6-disulfonic acid and 1 - (2' - chlorophenyl) - 3-methyl-5-pyrazolone which dyestuff corresponds to the formula

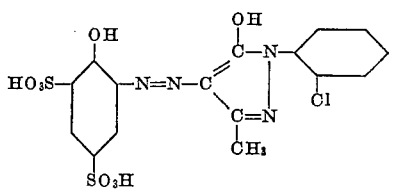

are stirred with 20 parts of crystallized sodium acetate in 500 parts of water and dissolved by heating to 70° C. 120 parts of a cobalt sulfate solution containing 7.1 parts of cobalt are added and the whole is stirred for 30 minutes at 70 to 75° C. The cobalt complex is precipitated by the addition of 140 parts of sodium chloride, filtered and dried. It is a brown powder which readily dissolves in water with an orange coloration and dyes anodized aluminum golden yellow shades.

A similar cobalt complex is obtained by this method when the sodium salt of the dyestuff from diazotized 2-amino-1-hydroxybenzene-4,6-disulfonic acid and 1-phenyl-3-methyl-5-pyrazolone is used as starting material.

What we claim is:

1. A complex metal compound which contains one of the metals selected from the group consisting of cobalt and copper in complex combination with a monoazo dyestuff containing two sulfonic acid groups and corresponding to the formula

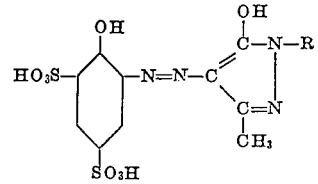

wherein R stands for a benzene radical.

2. A complex copper compound of a monoazo dyestuff containing two sulfonic acid groups and corresponding to the formula

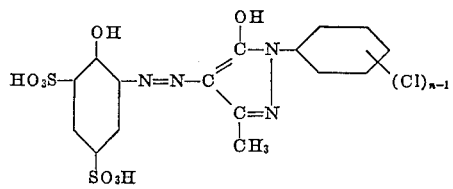

wherein $n$ represents a whole number which is at most 3.

3. A complex cobalt compound of a monoazo dyestuff containing two sulfonic acid groups and corresponding to the formula

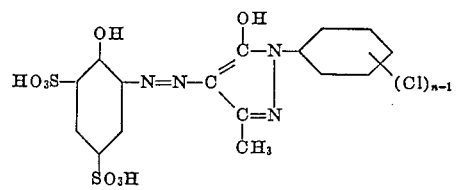

wherein $n$ represents a whole number which is at most 3.

4. The complex cobalt compound of the monoazo dyestuff containing two sulfonic acid groups and corresponding to the formula

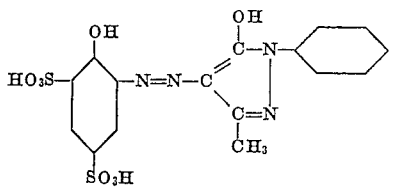

5. The complex copper compound of the monoazo dyestuff containing two sulfonic acid groups and corresponding to the formula

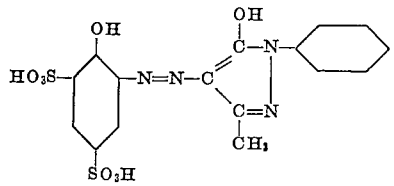

6. The complex copper compound of the monoazo dyestuff of the formula

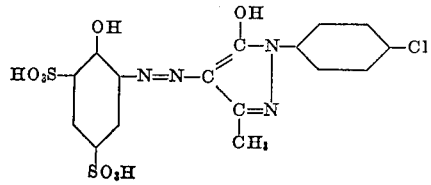

7. The complex cobalt compound of the monoazo dyestuff of the formula
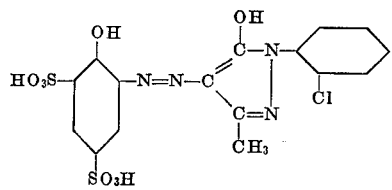
CHRISTIAN ZICKENDRAHT.
ROBERT WITTWER.
References Cited in the file of this patent
UNITED STATES PATENTS
| Number | Name | Date |
| --- | --- | --- |
| 1,216,813 | Jagerspacher | Feb. 20, 1917 |
| 1,959,507 | Straub et al. | May 22, 1934 |
| 2,165,034 | Daudt et al. | July 4, 1939 |
| 2,421,315 | Carson | May 27, 1947 |
| 2,443,226 | Carson | June 15, 1948 |
| 2,512,251 | Kleene | June 20, 1950 |